US011138684B2

(12) United States Patent
Yoshida et al.

(10) Patent No.: US 11,138,684 B2
(45) Date of Patent: Oct. 5, 2021

(54) IMAGE PROCESSING APPARATUS, IMAGE PROCESSING METHOD, AND ROBOT SYSTEM (71) Applicant: FANUC CORPORATION, Yamanashi (JP)

(72) Inventors: Junichirou Yoshida, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/854,919

(22) Filed: Apr. 22, 2020

(65) Prior Publication Data
US 2020/0342563 A1 Oct. 29, 2020

(30) Foreign Application Priority Data
Apr. 25, 2019 (JP) .............................. JP2019-084349

(51) Int. Cl.
*G06T 1/00* (2006.01)
*G06K 9/20* (2006.01)
(52) U.S. Cl.
CPC .......... *G06T 1/0014* (2013.01); *G06K 9/2054* (2013.01); *G06K 2209/21* (2013.01)
(58) Field of Classification Search
CPC . G06T 2207/10028; G06T 7/593; G06T 7/55; G06T 7/0002; G06T 11/00; G06T 2207/20192; G06T 7/13; G06T 7/136; G06T 2207/10152; G06T 7/0004; G06T 1/0014; H04N 2013/0081; H04N 13/128; H04N 13/239; H04N 2213/003;
(Continued)

(56) References Cited
U.S. PATENT DOCUMENTS 5,386,228 A * 1/1995 Okino .................. H04N 1/1915
348/218.1
6,453,069 B1 * 9/2002 Matsugu .................. G06K 9/48
382/173
(Continued)

FOREIGN PATENT DOCUMENTS

JP 2013-186088 A 9/2013
JP 2016-185573 A 10/2016

OTHER PUBLICATIONS

Birchfield et al., "Depth Discontinuities by Pixel-to-Pixel Stereo", (pp. 269-293) (Year: 1999).*

*Primary Examiner* — Manav Seth
(74) *Attorney, Agent, or Firm* — Hauptman Ham, LLP (57) ABSTRACT

An image processing apparatus includes a two-dimensional image storage unit configured to store a plurality of two-dimensional image data captured by photographing an identical imaging target object under different exposure conditions; a distance image storage unit configured to store distance image data including a pixel array of a known relationship to a pixel array of the two-dimensional image data; a pixel extraction unit configured to extract, among pixels in each of the two-dimensional image data, a first pixel at which a difference in brightness between identical pixels is less than a predetermined value; and a distance image adjusting unit configured to specify a second pixel of the distance image data at a position corresponding to the first pixel in the pixel array, and to set the second pixel as a non-imaging pixel in the distance image data.

6 Claims, 11 Drawing Sheets (58) Field of Classification Search
CPC .............. H04N 13/207; H04N 13/268; G06K 9/00288; G06K 9/6202; G06K 2209/21; G06K 2209/401; G06K 9/00268; G06K 9/2018; G06K 9/46; G06K 9/6204; G06K 9/2054

See application file for complete search history.

(56) References Cited

U.S. PATENT DOCUMENTS

| | | | | |
|---|---|---|---|---|
| 6,988,610 | B2* | 1/2006 | Fromme | B65G 43/02 198/502.1 |
| 7,599,533 | B2* | 10/2009 | Nishimura | G06T 7/0012 378/98 |
| 7,672,517 | B2* | 3/2010 | Buscema | G06T 7/0012 382/232 |
| 7,701,455 | B2* | 4/2010 | Tsao | G06T 15/04 345/419 |
| 7,756,299 | B2* | 7/2010 | Higaki | G06T 7/11 382/106 |
| 8,174,611 | B2* | 5/2012 | Estevez | G06T 7/174 348/371 |
| 8,340,464 | B2* | 12/2012 | Watanabe | G06T 5/50 382/284 |
| 8,459,073 | B2* | 6/2013 | Isei | G01N 21/8806 72/9.2 |
| 8,654,219 | B2* | 2/2014 | Im | H04N 5/367 348/246 |
| 8,699,821 | B2* | 4/2014 | Orr, IV | H04N 5/2351 382/294 |
| 8,730,318 | B2* | 5/2014 | Nakahira | H04N 5/217 348/92 |
| 8,780,113 | B1* | 7/2014 | Ciurea | G06T 15/20 345/427 |
| 9,113,142 | B2* | 8/2015 | Boisson | H04N 13/122 |
| 9,247,153 | B2* | 1/2016 | Umezu | H04N 5/23264 |
| 9,270,902 | B2* | 2/2016 | Watanabe | H04N 5/142 |
| 9,275,464 | B2* | 3/2016 | Levy | G06T 5/002 |
| 9,294,695 | B2* | 3/2016 | Kageyama | G06T 11/001 |
| 9,412,172 | B2* | 8/2016 | Sorkine-Hornung | G06T 7/557 |
| 9,582,888 | B2* | 2/2017 | Ramachandra | G06T 5/002 |
| 9,832,404 | B2* | 11/2017 | Ishiga | H04N 9/04515 |
| 10,059,002 | B2* | 8/2018 | Miyatani | B25J 9/1697 |
| 10,127,622 | B2* | 11/2018 | Nishitani | B25J 9/1697 |
| 10,157,495 | B2* | 12/2018 | Bendall | G06T 7/62 |
| 10,198,792 | B2* | 2/2019 | Lai | H04N 19/14 |
| 10,212,408 | B1* | 2/2019 | Pappas-Katsiafas | H04N 13/156 |
| 10,292,321 | B2* | 5/2019 | Neitemeier | G06K 9/6267 |
| 10,313,569 | B2* | 6/2019 | Shiramizu | H04N 5/23296 |
| 10,339,668 | B2* | 7/2019 | Takizawa | G06K 9/00201 |
| 10,380,911 | B2* | 8/2019 | Hsu | G09B 19/00 |
| 10,434,654 | B2* | 10/2019 | Namiki | B25J 9/163 |
| 10,477,175 | B2* | 11/2019 | Ogasawara | A63F 13/25 |
| 10,498,963 | B1* | 12/2019 | Sorgi | G06T 5/003 |
| 10,502,556 | B2* | 12/2019 | Meng | G01B 11/25 |
| 10,582,180 | B2* | 3/2020 | Nobayashi | H04N 13/15 |
| 10,863,105 | B1* | 12/2020 | Rosengaus | H04N 5/2258 |
| 10,869,010 | B2* | 12/2020 | Ogasawara | A63F 13/42 |
| 10,917,543 | B2* | 2/2021 | Ramirez Luna | B25J 9/0009 |
| 10,986,267 | B2* | 4/2021 | Aldridge | H04N 5/2355 |
| 2004/0125206 | A1* | 7/2004 | Lohmann | B25J 9/1674 348/155 |
| 2005/0162644 | A1* | 7/2005 | Watanabe | G01N 21/95684 356/237.1 |
| 2009/0027509 | A1* | 1/2009 | Giesen | H04N 5/23206 348/211.3 |
| 2010/0033619 | A1* | 2/2010 | Kimura | G03B 7/28 348/364 |
| 2014/0176761 | A1* | 6/2014 | Takizawa | G06T 5/008 348/225.1 |
| 2015/0371398 | A1* | 12/2015 | Qiao | G06T 7/174 382/154 |
| 2016/0155235 | A1* | 6/2016 | Miyatani | G06K 9/036 382/103 |
| 2016/0175964 | A1* | 6/2016 | Penoyer | B23K 9/0956 219/124.34 |
| 2016/0279809 | A1* | 9/2016 | Nakajima | G06K 9/00664 |
| 2017/0257540 | A1* | 9/2017 | Shiramizu | G01B 11/2504 |
| 2018/0023947 | A1* | 1/2018 | Meng | G01B 11/25 348/46 |
| 2018/0084708 | A1* | 3/2018 | Neitemeier | G06T 7/0004 |
| 2019/0033067 | A1* | 1/2019 | Yamagami | G01B 11/2545 |
| 2020/0021743 | A1* | 1/2020 | Yoshida | B25J 9/1697 |
| 2020/0175352 | A1* | 6/2020 | Cha | G06N 3/0454 |
| 2020/0226729 | A1* | 7/2020 | Zhang | G06T 5/50 |

* cited by examiner

IMAGE PROCESSING APPARATUS, IMAGE PROCESSING METHOD, AND ROBOT SYSTEM

RELATED APPLICATIONS

The present application claims priority to Japanese Application Number 2019-084349, filed Apr. 25, 2019, the disclosure of which is hereby incorporated by reference herein in its entirety.

BACKGROUND OF THE INVENTION

1. Field of the Invention

The present invention relates to an image processing apparatus, an image processing method, and a robot system.

2. Description of the Related Art

There is known a robot system configured to recognize an object by a camera and to handle the recognized object by a robot. For example, Japanese Unexamined Patent Publication (Kokai) No. 2016-185573A discloses a robot system including a target object selection unit configured to select a target object; a proximity state determination unit configured to determine whether another object is disposed in proximity to the target object; an avoidance vector determination unit configured to determine an avoidance vector such that no interference with the object occurs; and a picking path correction unit configured to generate a corrected path which is obtained by correcting a picking path, based on the avoidance vector. A system disclosed in Japanese Unexamined Patent Publication (Kokai) No. 2013-186088A performs three-dimensional position/attitude measurement of a target object by using a first sensor configured to acquire two-dimensional (2D) information or three-dimensional (3D) information of the target object and a second sensor configured to acquire 2D information or 3D information of the target object.

SUMMARY OF INVENTION

When a two-dimensional camera which acquires a two-dimensional (2D) image is used for recognition of an object, a contour of the object is extracted from the 2D image and the contour is used for separation of the object, and there may be a case in which the contour of the object is not properly extracted due to an influence of a pattern of a surface of the object (e.g. a packing tape attached to a surface of a cardboard box that is the object), and erroneous recognition occurs. On the other hand, there is a method of extracting a contour of an object without an influence of a surface of the object, by using a three-dimensional camera for recognition of the object, the 3D camera being capable of acquiring a distance image representative of a distance to the object. However, in such a case that a plurality of objects are arranged close to each other, it may be possible that, with a distance image of a low resolution, the objects are unable to be recognized by separating the objects by a narrow gap between the objects.

According to one aspect of the present disclosure, an image processing apparatus includes a two-dimensional image storage unit configured to store a plurality of two-dimensional image data captured by photographing an identical imaging target object under different exposure conditions; a distance image storage unit configured to store distance image data representative of distance information depending on a spatial position of the imaging target object, the distance image data including a pixel array of a known relationship to a pixel array of the two-dimensional image data; a pixel extraction unit configured to extract, among a plurality of pixels in each of the two-dimensional image data, a first pixel at which a difference in brightness between identical pixels is less than a predetermined value; and a distance image adjusting unit configured to specify a second pixel of the distance image data at a position corresponding to the first pixel in the pixel array, and to set the second pixel as a non-imaging pixel in the distance image data.

According to another aspect of the present disclosure, a robot system includes a robot; a robot controller configured to control the robot; and the above-described image processing apparatus, wherein the robot controller is configured to cause the robot to handle the imaging target object, based on the distance image data acquired as a result of the distance image adjusting unit setting the second pixel as the non-imaging pixel.

According to still another aspect of the present disclosure, an imaging processing method includes storing a plurality of two-dimensional image data captured by photographing an identical imaging target object under different exposure conditions; storing distance image data representative of distance information depending on a spatial position of the imaging target object, the distance image data including a pixel array of a known relationship to a pixel array of the two-dimensional image data; extracting, among a plurality of pixels in each of the two-dimensional image data, a first pixel at which a difference in brightness between identical pixels is less than a predetermined value; and specifying a second pixel of the distance image data at a position corresponding to the first pixel in the pixel array, and setting the second pixel as a non-imaging pixel in the distance image data.

BRIEF DESCRIPTION OF THE DRAWINGS

The object, features and advantages of the present invention will be more clearly understood by the description below of an embodiment relating to the accompanying drawings. In the accompanying drawings.

DETAILED DESCRIPTION

Hereinafter, an embodiment of the present disclosure will be described with reference to the accompanying drawings. Corresponding constituent elements are denoted by the same reference numerals throughout the drawings. These drawings use different scales as appropriate to facilitate understanding. The mode illustrated in each drawing is one example for carrying out the present invention, and the present invention is not limited to the modes illustrated in the drawings.

Figure 1:
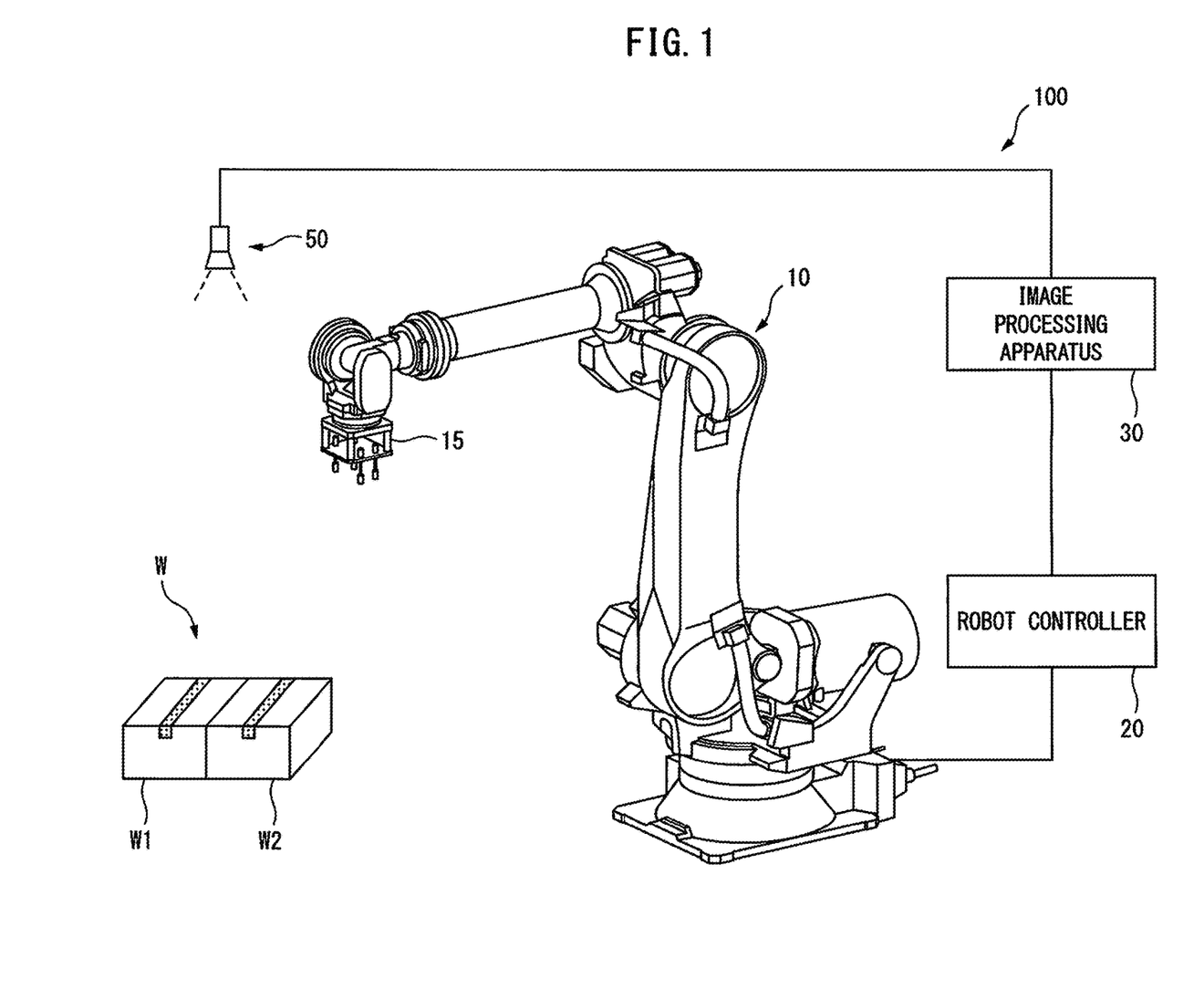
FIG. 1 is a view illustrating an entire configuration of a robot system including an image processing apparatus according to one embodiment.
Figure 2:
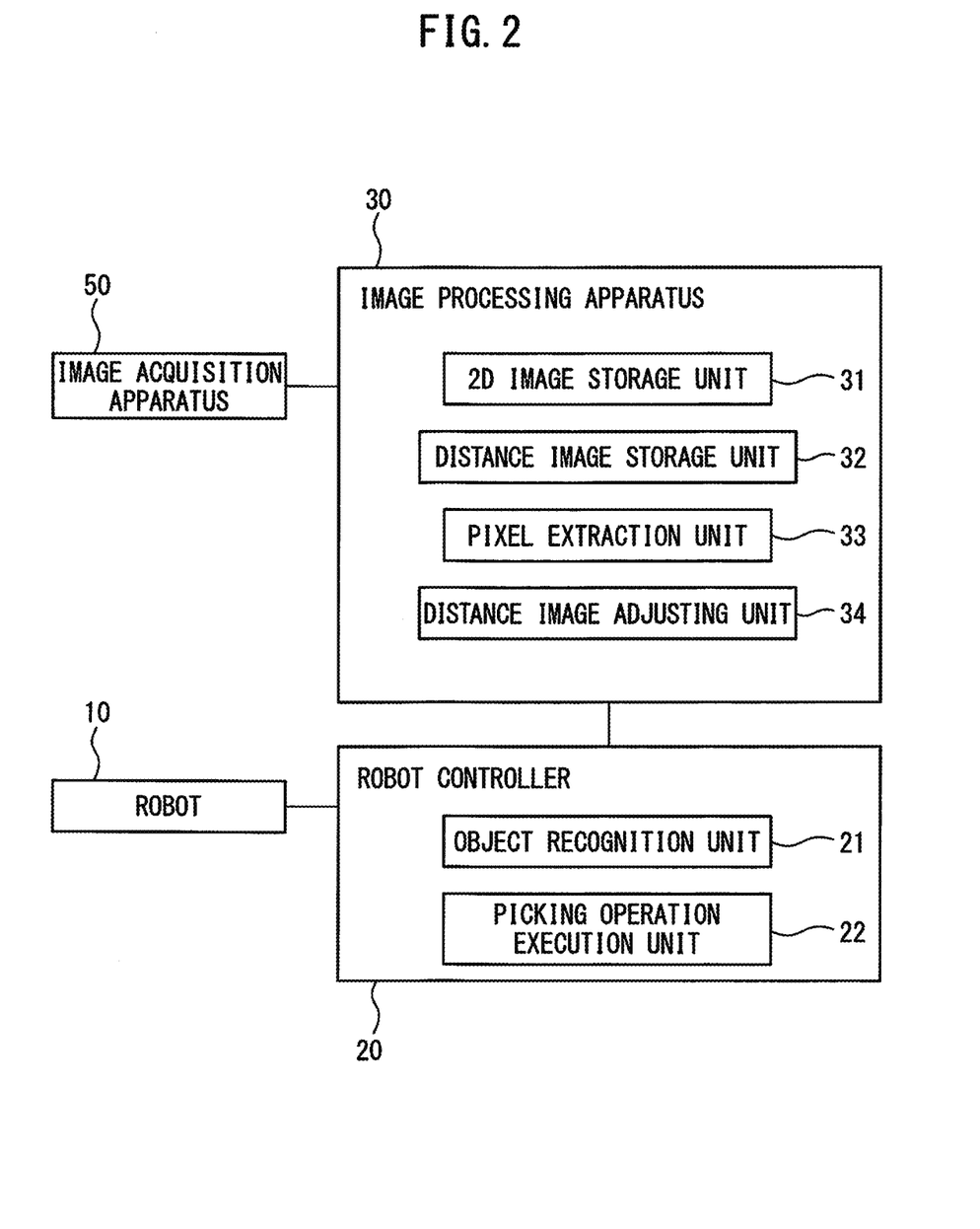
FIG. 2 is a functional block diagram of the image processing apparatus and a robot controller.

FIG. 1 is a view illustrating an entire configuration of a robot system 100 including an image processing apparatus 30 according to an embodiment. FIG. 2 is a functional block diagram of the image processing apparatus 30 and a robot controller 20. As illustrated in FIG. 1, the robot system 100 includes a robot 10, the robot controller 20 which controls the robot 10, and the image processing apparatus 30. As illustrated in FIG. 2, the image processing apparatus 30 includes a two-dimensional (2D) image storage unit 31 which stores a plurality of two-dimensional (2D) image data captured by photographing an identical imaging target object W under different exposure conditions; a distance image storage unit 32 which stores distance image data representative of distance information depending on a spatial position of the imaging target object W, the distance image data including a pixel array of a known relationship to a pixel array of the 2D image data; a pixel extraction unit 33 which extracts, among a plurality of pixels in each of a plurality of 2D image data, a pixel (hereinafter, also referred to as "first pixel") at which a difference in brightness between identical pixels is less than a predetermined value; and a distance image adjusting unit 34 which specifies a pixel (hereinafter, also referred to as "second pixel") of the distance image data at a position corresponding to the first pixel in the pixel array, and sets the second pixel as a non-imaging pixel in the distance image data.

The robot system 100 further includes an image acquisition apparatus 50 which is connected to the image processing apparatus 30. The image acquisition apparatus 50 includes a function as a three-dimensional (3D) camera, which acquires a distance image representative of distance information depending a spatial position of the imaging target object W, and a function as a two-dimensional (2D) camera, which acquires a two-dimensional (2D) image of the imaging target object W with an identical pixel array to a pixel array of the distance image. For example, the image acquisition apparatus 50 may include a light source, a projector which projects pattern light, and two cameras disposed on both sides of the projector with the projector being interposed, and may be configured to photograph an object, on which the pattern light is projected, by the two cameras disposed at different positions, and to acquire three-dimensional (3D) position information of the object by a stereo method. In this case, the image processing apparatus 50 can acquire a distance image and a 2D image which have an identical pixel array, or a distance image and a 2D image which have pixel arrays of a known correspondence relation. As a method for acquiring 3D position information of the object, other kinds of methods may be used. The image processing apparatus 50 is disposed at a known position in a working space where the robot 10 is disposed, and photographs the imaging target object W from above. Note that the image processing apparatus 50 may be attached to a wrist portion at an arm tip end of the robot 10.

In the present embodiment, as the image acquisition apparatus 50, a configuration in which one camera acquires both the distance image and the 2D image is adopted. However, the embodiment is not limited to this, and the image acquisition apparatus 50 may be configured such that a 3D camera that acquires the distance image of the object and a 2D camera that acquires the 2D image are separately disposed in the robot system 100. In this case, the correspondence relation between the pixel array of the distance image and the pixel array of the 2D image is calibrated in advance and set in a known state.

The robot controller 20 causes the robot 10 to handle the imaging target object W, based on the distance image data which is adjusted by the image processing apparatus 30. For example, as illustrated in FIG. 2, the robot controller 20 may be configured to include an object recognition unit 21 which performs image recognition of the object by pattern matching by using the distance image data which is adjusted by the image processing apparatus 30, and a picking operation execution unit 22 which executes a picking operation of the object. A grasping device 15 is attached to the wrist portion at the arm tip end of the robot 10. In this configuration, the picking operation execution unit 22 moves the robot 10 and grasps and picks, by the grasping device 15, the object which is recognized by the object recognition unit 21 by using the distance image.

In FIG. 1, the robot 10 is illustrated as being a vertical articulated robot, but some other type of robot may be used as the robot 10. Each of the robot controller 20 and the image processing apparatus 30 may have a configuration of a general computer including a CPU, a ROM, a RAM, a storage device, an operation unit, a display unit, a network interface, an external device interface, and the like.

Figure 4:
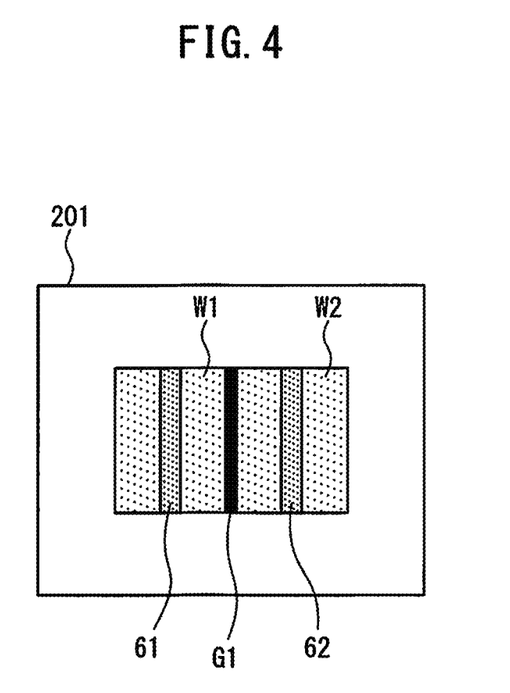
FIG. 4 illustrates a two-dimensional (2D) image of two cardboard boxes photographed by the image process.

An explanation is given of a problem of erroneous recognition, which may possibly occur when an object is recognized by using a 2D image or a distance image. As illustrated in FIG. 1 by way of example, a case is considered in which the imaging target object W includes surfaces of a plurality of objects (two cardboard boxes W1 and W2) which are juxtaposed with a gap therebetween. FIG. 4 illustrates a 2D image 201 captured by photographing two cardboard boxes W1 and W2 by the image acquisition apparatus 50 illustrated in FIG. 1. In the present embodiment, it is assumed that the 2D image is acquired as a gray-scale image. The two cardboard boxes W1 and W2 appear on the 2D image 201 of FIG. 4. A packing tape 61 extending in a vertical direction appears in a central part of the cardboard box W1, with a gray level slightly darker than the main body of the cardboard box W1, and similarly a packing tape 62 extending in the vertical direction appears in a central part of the cardboard box W2, with a gray level slightly darker than the main body of the cardboard box W2. A narrow gap G1 between the two cardboard boxes W1 and W2 appears dark in the 2D image 201.

Figure 5:
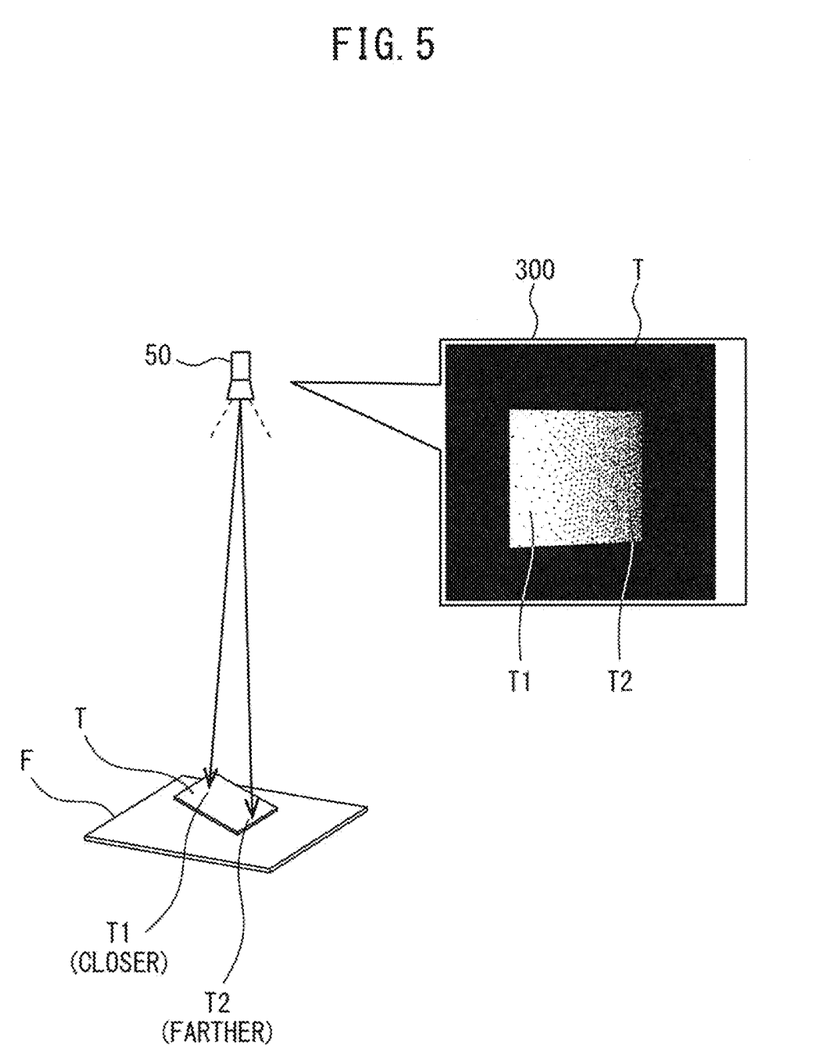
FIG. 5 is a view for explaining a distance image.

FIG. 5 is a view for explaining a distance image. Consideration is now given to a case in which a distance image of an object T, which is disposed with an inclination to an installation floor F, as illustrated in FIG. 5, is acquired by the image acquisition apparatus 50. When viewed from the image acquisition apparatus 50, a second portion T2 side of the object T is farther than a first portion T1 side of the object T. In the generation of the distance image, distance information is visualized into an image by varying a color or a gray level in accordance with the distance from the camera to the object. A distance image 300 of FIG. 5 is an example of the case in which a brighter expression is used for a position closer to the image acquisition apparatus 50, and a darker expression is used for a position farther from the image acquisition apparatus 50. Thus, in the distance image 300, the second portion T2 side of the object T is expressed to be dark, and the first portion T1 side is expressed to be bright.

Figure 6A:
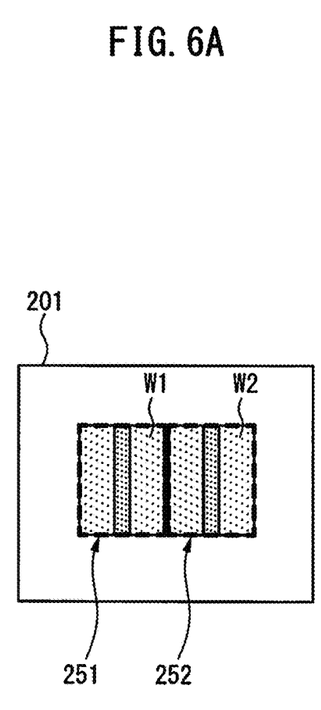
FIG. 6A to FIG. 6C are views for explaining image recognition of objects with use of 2D images.
Figure 6B:
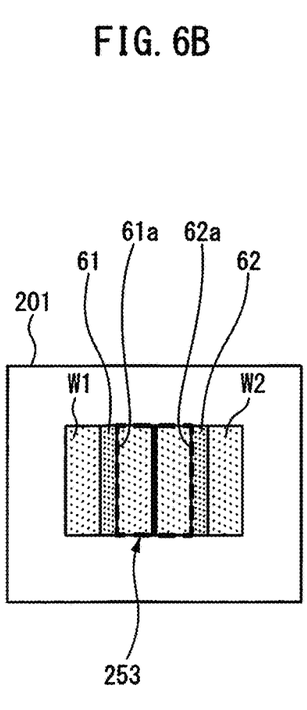
Figure 6C:
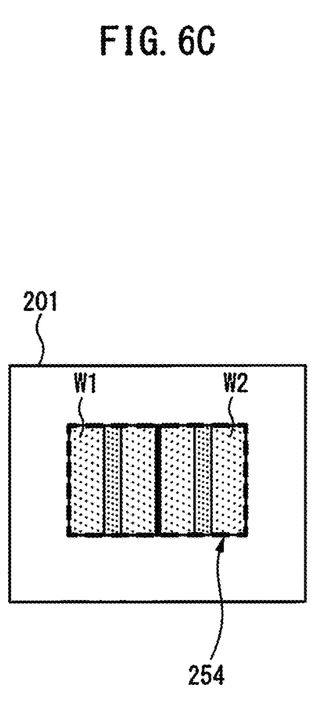

Consideration is now given to the case in which the cardboard boxes W1 and W2 are individually recognized by pattern matching by using the 2D image 201 acquired as illustrated in FIG. 4. FIG. 6A illustrates a case in which the two cardboard boxes W1 and W2 are correctly recognized as indicated by thick frames 251 and 252 of broken lines. When the object is recognized by the 2D image, however, there may be a case in which, as indicated by a thick frame 253 of a broken line in FIG. 6B, a contour line 61a of the packing tape 61 and a contour line 62a of the packing tape 62 are erroneously recognized as contour lines of the cardboard boxes of the recognition target object, and the cardboard boxes of the recognition target object are erroneously recognized as existing in the position of the thick frame 253. In addition, as indicated by a thick frame 254 of a broken line in FIG. 6C, there may be a case in which a contour surrounding the entirety of the two cardboard boxes W1 and W2 is erroneously recognized as one cardboard box. The reason for the erroneous recognition in FIG. 6C is that in the recognition process of the object, there is a case in which the size of a template is enlarged or reduced in order to cope with the fact that the size of the object varies on the 2D image in accordance with the height of the object (the distance from the camera to the object). FIG. 6C corresponds to a case in which the cardboard boxes of the recognition target object are erroneously recognized as existing at a position closer to the image acquisition apparatus 50 than in the case of FIG. 6A. As described above, in the recognition of the object by the 2D image, there is a case in which the position of the object is erroneously recognized.

Figure 7:
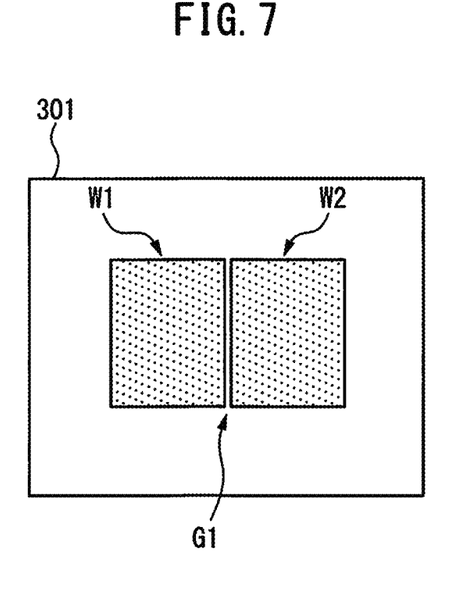
FIG. 7 illustrates a distance image in a case of photographing two cardboard boxes with use of a three-dimensional (3D) camera of a high resolution.
Figure 8:
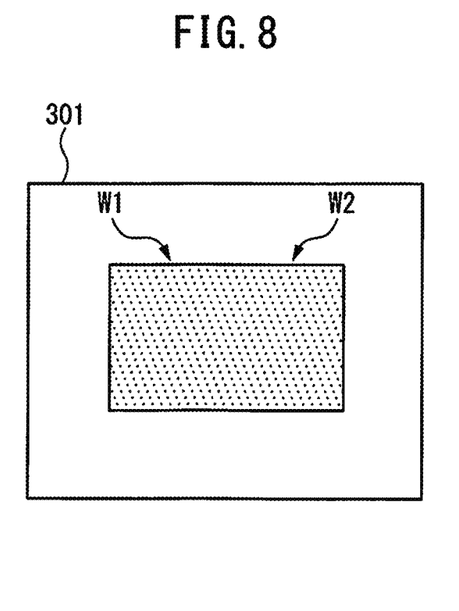
FIG. 8 illustrates a distance image in a case of photographing two cardboard boxes with use of a 3D camera of a low resolution.

FIG. 7 illustrates a distance image 301 in a case of photographing the two cardboard boxes W1 and W2 illustrated in FIG. 1 with use of a 3D camera of a high resolution, from the position of the image acquisition apparatus 50. As illustrated in FIG. 7, in the distance image 301, the gap G1 between the two cardboard boxes W1 and W2 is exactly depicted. In a distance image, a pattern on the object is not visualized into an image. Thus, in the distance image 301, since the packing tapes 61 and 62 do not appear on the cardboard boxes W1 and W2, the above-described problem of erroneous recognition due to the contour lines of packing tapes illustrated in FIG. 6B does not occur. On the other hand, FIG. 8 illustrates a distance image 302 in a case of photographing the two cardboard boxes W1 and W2 illustrated in FIG. 1 with use of a 3D camera of a low resolution, from the position of the image acquisition apparatus 50. As illustrated in FIG. 8, in the case of the distance image 302, an image of the gap G1 blurs and disappears. When image recognition is performed with the distance image 302, it is not possible to separately recognize the two cardboard boxes W1 and W2. In this manner, while the distance image is not affected by the pattern of the object, there is a need to use an expensive high-resolution 3D camera in order to reproduce details.

Figure 3:
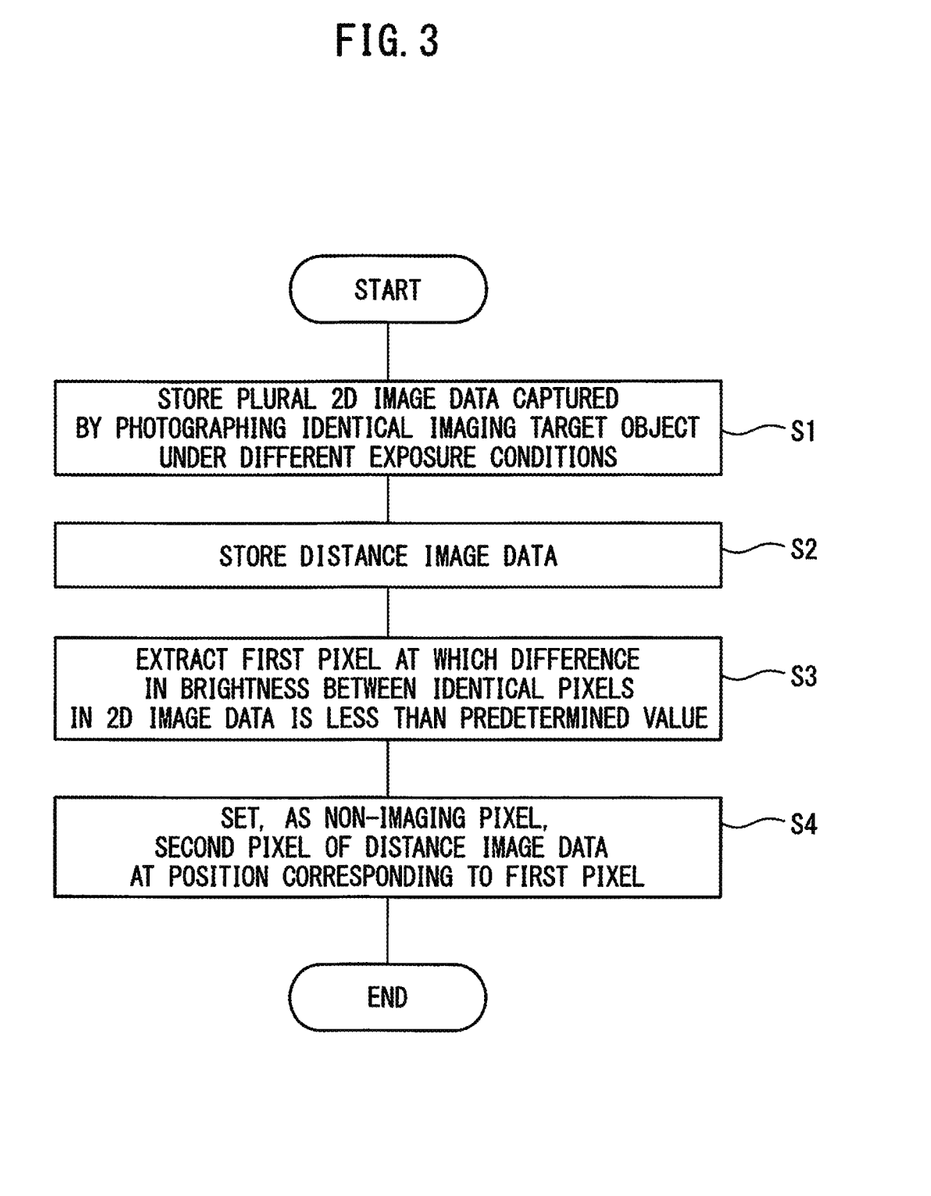
FIG. 3 is a flowchart illustrating an image processing executed by the image processing apparatus.

The image processing apparatus 30 according to the present embodiment is configured to solve the above-described problem which may occur when the image recognition of the object is performed by using the distance image. Referring to FIG. 3, a description will be given of an image processing method which is implemented by the image processing apparatus 30. FIG. 3 is a flowchart illustrating an image processing executed under the control by a CPU of the image processing apparatus 30. The image processing apparatus 30 executes the image processing as described below, by using the distance image data and 2D image data acquired by the image acquisition apparatus 50. To start with, the image processing apparatus 30 stores, in the 2D image storage unit 31, a plurality of 2D image data captured by photographing an identical imaging target object W under different exposure conditions (step S1). Next, the image processing apparatus 30 stores, in the distance image storage unit 32, distance image data representative of distance information depending on a spatial position of the imaging target object W, the distance image data including a pixel array of a known relationship to a pixel array of the 2D image data (step S2).

Figure 9:
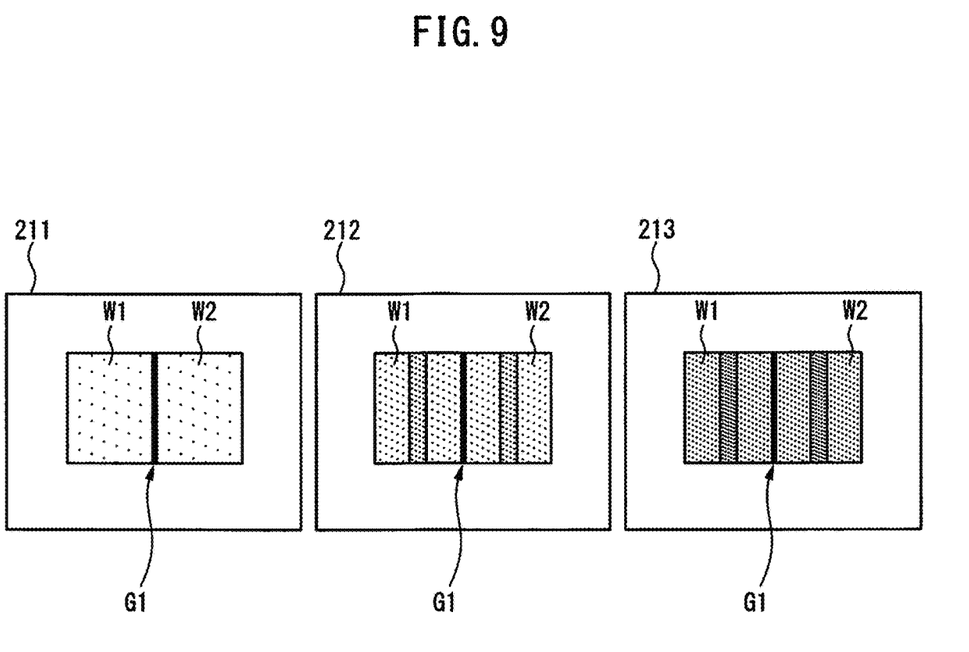
FIG. 9 illustrates an example of three 2D images captured by photographing an identical imaging target object under different exposure conditions.

FIG. 9 illustrates examples of three 2D images 211 to 213 captured by photographing an identical imaging target object W under different exposure conditions. The exposure conditions may be changed by various methods, such as adjustment of the luminance of a light source of illumination light, an exposure time, a diaphragm, the sensitivity of an imaging element, etc. As an example, it is assumed that the exposure time is adjusted. In the 2D images 211 to 213 illustrated in FIG. 9, the exposure time of the 2D image 211 is longest, the exposure time of the 2D image 212 is second longest, and the exposure time of the 2D image 213 is shortest. Normally, the brightness of a whole image is proportional to the exposure time. Thus, the gray level of the surfaces of the cardboard boxes W1 and W2 varies in accordance with the length of exposure time. Specifically, the surface of the cardboard box W1, W2 in the 2D image 211 is brightest, the surface of the cardboard box W1, W2 in the 2D image 212 is second brightest, and the surface of the cardboard box W1, W2 in the 2D image 213 is darkest. In contrast to the variation in brightness of the surface of the cardboard box W1, W2 due to the variation in exposure time, the brightness of the image of the part of the gap G1 between the cardboard box W1 and cardboard box W2 does not substantially change, and the image of the part of the gap G1 remains dark. The reason for this is that since light from a space such as the gap G1 does not easily return to the image acquisition apparatus 50, such a space always appears dark regardless of the exposure time. The image processing apparatus 30 (pixel extraction unit 33) extracts an image (pixel) of the part of the space, based on the fact that the image of the part of the space, such as a gap, a slit or a hole, has a lower degree of variation in brightness relative to the variation of the exposure condition than the image of the other part.

In step S3, among the pixels in each of a plurality of 2D image data, a first pixel at which a difference in brightness between identical pixels is less than a predetermined value is extracted. For example, the extraction of the first pixel is performed as follows.

(1) The degree of variation in brightness relative to the variation in exposure time is calculated with respect to all pixels between the 2D image 211 and the 2D image 212.

(2) The degree of variation in brightness relative to the variation in exposure time is calculated with respect to all pixels between the 2D image 212 and the 2D image 213.

(3) The mean value of the above (1) and (2) is calculated with respect to each pixel.

(4) A pixel, at which the "degree of variation in brightness relative to the variation in unit exposure time" calculated in the above (3) is less than a predetermined value, is extracted.

By the process of the above (1) to (4), the first pixel, which constitutes the image of the part of the gap G1, can be extracted. The "predetermined value" may be set by various methods, such as a method of setting a fixed value, for instance, an experimental value or an empirical value, or a method of setting the "predetermined value", based on the "variation in brightness relative to the variation in exposure time" for each pixel acquired by the above (3). In the case of the latter, there may be a method in which a value calculated by subtracting a certain value from a maximum value in all pixels of the "variation in brightness relative to the variation in exposure time", or a value calculated by subtracting a certain value from a mean value in all pixels of the "variation in brightness relative to the variation in exposure time", is set as the "predetermined value". Note that the extraction of the first pixel can be performed if there are two 2D images captured by photographing an identical imaging target object W under different exposure conditions.

Figure 10:
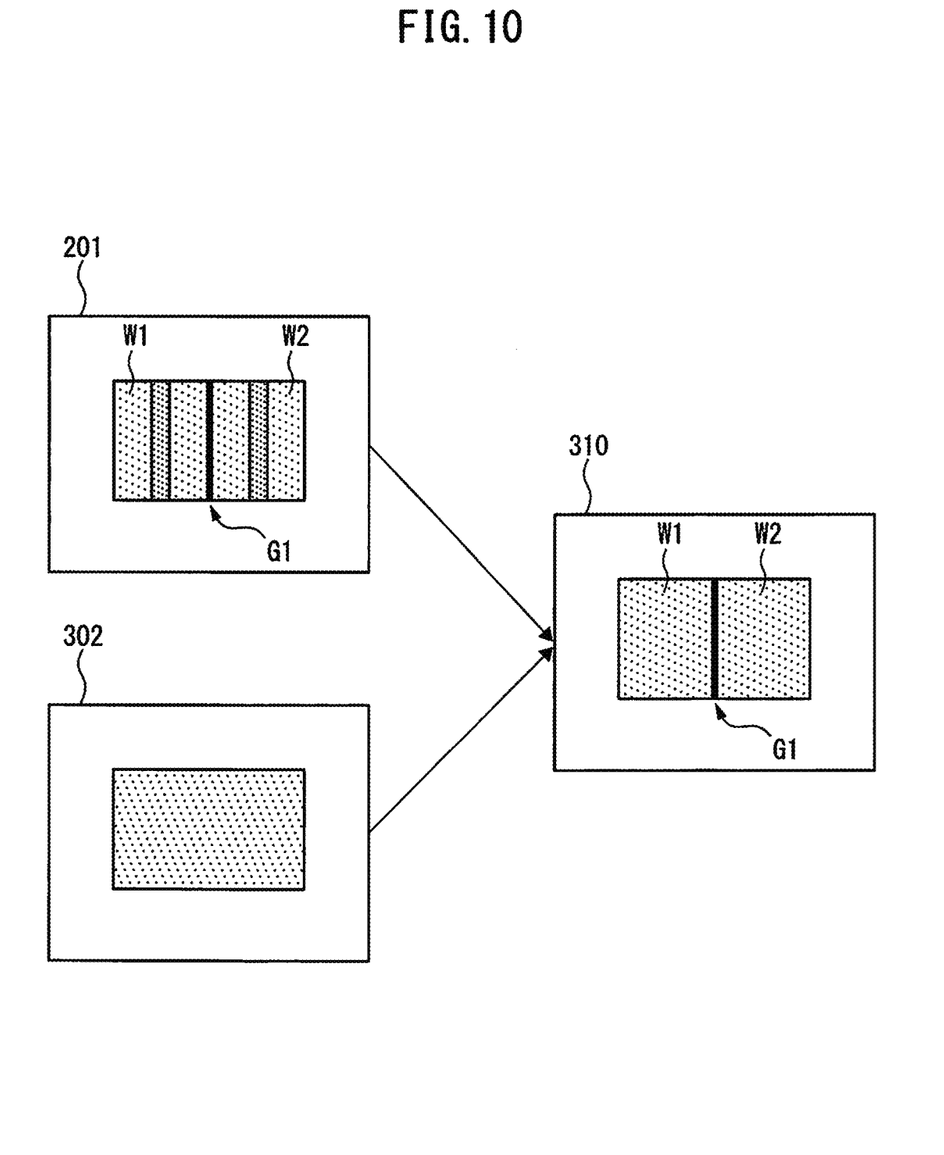
FIG. 10 is a view for explaining a distance image generated by the image process of FIG. 3.

In step S4, the image processing apparatus 30 specifies, in the pixel array in the distance image 302, a second pixel of distance image data existing at a position corresponding to the first pixel extracted in the 2D image in step S3, and sets the second pixel as a non-imaging pixel in the distance image data. To set the second pixel as the non-imaging pixel means that the second pixel is not set as a pixel representative of distance information. For example, the pixel value of the second pixel may be set to zero, or to some other invalid value which is not representative of distance information. Thereby, in the distance image 302, the objects can be separated by the part of the gap G1, and the objects can exactly be recognized. The process in step S4 will be described with reference to FIG. 10. As illustrated in FIG. 10, the first pixel included in the part of the gap G1 in the 2D image 201 is extracted by the above-described method, and the second pixel corresponding to the part of the gap G1 in the distance image 302 is set as the non-imaging pixel. Thereby, a distance image 310 illustrated in a right part of FIG. 10 is obtained. In the distance image 310, the second pixel in the part of the gap G1 is set as the non-imaging pixel, and the cardboard box W1 and cardboard box W2 are separated by the part of the gap G1. Thereby, the cardboard box W1 and cardboard box W2 can individually correctly be recognized.

Figure 11:
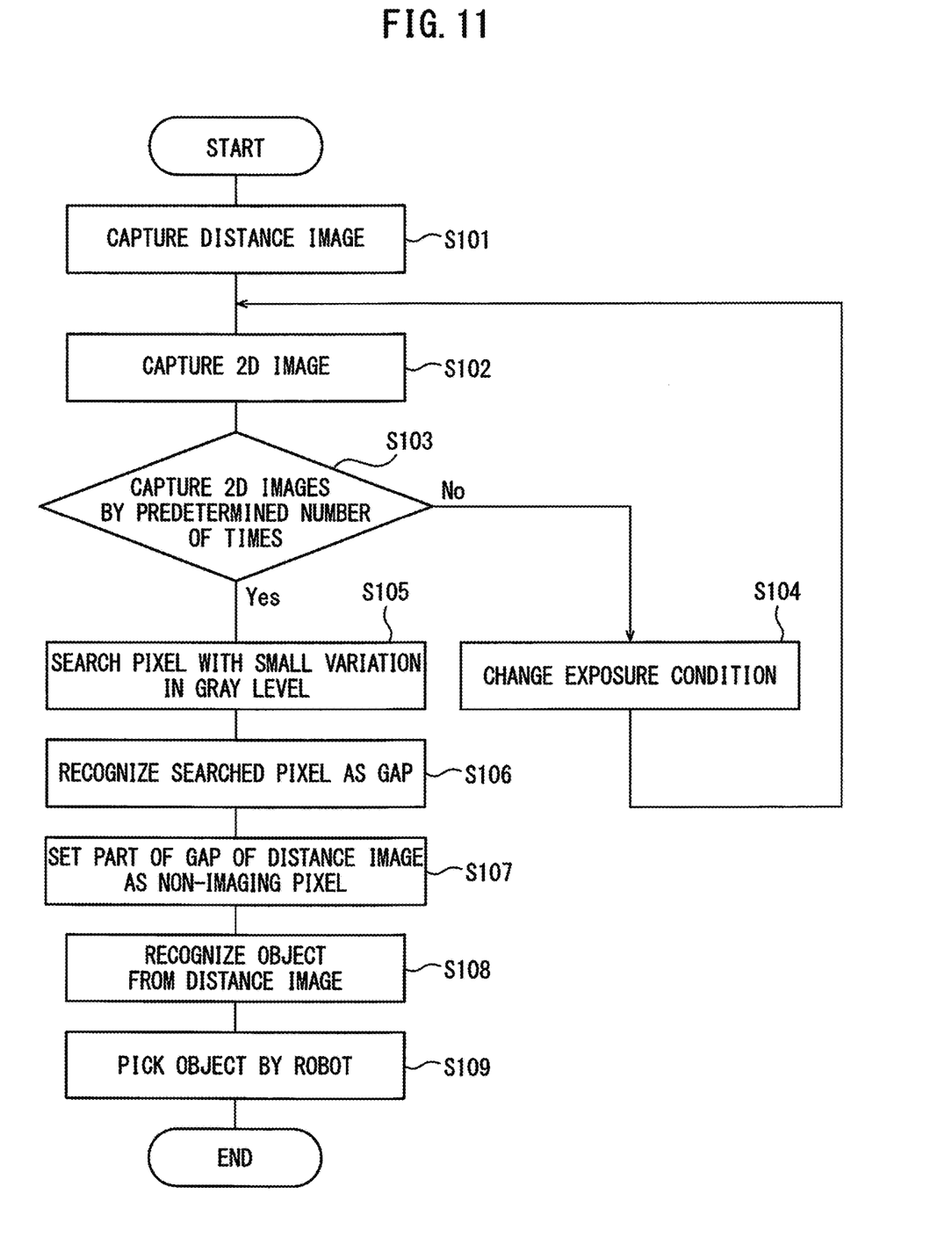
FIG. 11 is a flowchart illustrating an object picking process executed in the robot system.

Next, referring to FIG. 11, a description will be given of a process (hereinafter referred to as "object picking process") in a case of executing an operation of picking the cardboard box W1, W2 in the robot system 100. The object picking process is executed by a cooperative operation between the image processing apparatus 30 and robot controller 20. To start with, the image processing apparatus 30 causes the image acquisition apparatus 50 to capture a distance image of the imaging target object W, and stores the captured distance image (step S101). Next, the image processing apparatus 30 causes the image acquisition apparatus 50 to capture 2D images of the imaging target object W by a predetermined number of times, while changing the exposure condition, and stores the captured 2D images (steps S102, S103 and S104). Thereby, a plurality of 2D images of the imaging target object W under different exposure conditions, as exemplarily illustrated in FIG. 9, are acquired.

Next, the image processing apparatus 30 searches, in the 2D images, a pixel at which the degree of variation in brightness relative to the variation in exposure time is less than a predetermined value (step S105). The image processing apparatus 30 recognizes the searched pixel as a pixel (first pixel) of the part corresponding to the gap G1 between the cardboard boxes W1 and W2 (step S106). Next, the image processing apparatus 30 sets, as a non-imaging pixel, a pixel (second pixel) at a position corresponding to the gap G1 in the distance image acquired in step S101 (step S107).

Next, the object recognition unit 21 of the robot controller 20 recognizes the cardboard box W1 or W2 in the distance image by using model data of the cardboard box W1, W2 (step S108). The model data for object recognition is stored in a storage device (not illustrated) of the robot controller 20. Next, the picking operation execution unit 22 of the robot controller 20 calculates the position of the cardboard box W1 or W2 in a robot coordinate system, based on the position of the cardboard box W1 or W2 recognized in the distance image, and the position of the image acquisition apparatus 50 in the robot coordinate system. Based on the calculated position of the cardboard box W1 or W2 in the robot coordinate system, the picking operation execution unit 22 executes the operation of moving the robot 10 and individually grasping and picking the cardboard box W1 or W2 by the grasping device 15 (step S109).

Figure 12:
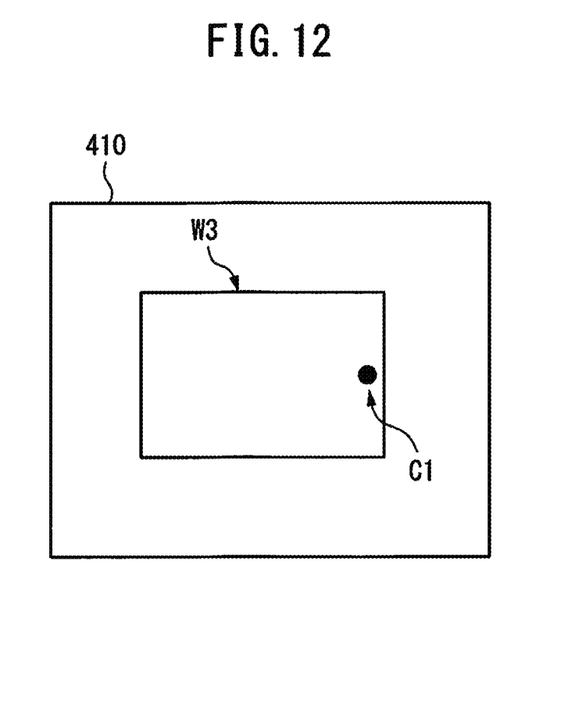
FIG. 12 illustrates a distance image obtained after the image process of FIG. 3 is executed on a distance image captured by photographing a work in which a hole is formed as a position mark.

The above-described method, which is a method by extracting, among the pixels in each of the 2D image data captured by photographing an identical imaging target object under different exposure conditions, the first pixel at which the difference in brightness between identical pixels is less than the predetermined value, can be used for, in addition to the extraction of a gap between objects, the extraction of a pixel which holds imaging information of a space from which reflective light of illumination light does not easily return to the camera, such as a hole, a slit or the like formed in an object. FIG. 12 illustrates a distance image 410 obtained after the image processing of FIG. 3 is executed on a distance image captured by photographing a plate-shaped work W3 in which a hole C1 is formed as a position mark. The part of the hole C1, too, always appears in a dark state on the 2D image, regardless of the change of the exposure condition. Even when the hole C1 is relatively small and the hole C1 is not reproduced by a distance image acquired by a 3D camera of a low resolution, the hole C1 serving as the position mark on the distance image 410 can be separated from the image of the work W3 and can be recognized, as illustrated in FIG. 12, by executing the image processing of FIG. 3. As a result, the direction of the work W3 can be correctly recognized by using the distance image 410.

Figure 13:
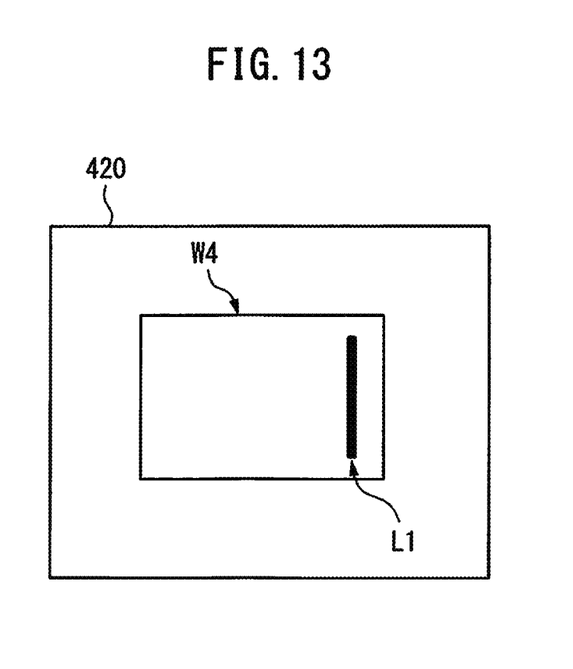
FIG. 13 illustrates a distance image obtained after the image process of FIG. 3 is executed on a distance image captured by photographing a work in which a narrow slit is formed.

FIG. 13 illustrates a distance image 420 obtained after the image processing of FIG. 3 is executed on a distance image captured by photographing a work W4 in which a narrow slit L1 is formed. As regards the part of the slit L1, too, the part of the slit L1 on the 2D image always appears in a dark state, regardless of the change of the exposure condition, since reflective light of illumination light does not easily return to the camera. Even when the slit L1 is narrow and the slit L1 is not reproduced by a distance image of a low resolution, the slit L1 on the distance image 420 can be separated from the image of the work W4 and can be recognized, as illustrated in FIG. 13, by executing the image processing of FIG. 3. As a result, the shape of the work W4 can be correctly recognized by using the distance image 420.

As described above, according to the present embodiment, an object can be recognized with high precision from a distance image.

Although the embodiment of the present disclosure was described above, it is understood by a skilled person that various modifications and changes can be made without departing from the scope of disclosure of Claims which will be stated below.

The configuration of the robot system illustrated in FIG. 1 and the configuration of the functional block diagram illustrated in FIG. 2 are merely examples, and the present invention is not limited to the configurations illustrated in FIGS. 1 and 2. For example, the various functions of the image processing apparatus 30 illustrated in FIG. 1 may be implemented in the robot controller 20. Some of the functions of the image processing apparatus 30 in FIG. 2 may be disposed on the robot controller 20 side. Alternatively, some of the functions of the robot controller 20 may be disposed in the image processing apparatus 30.

In the above-described embodiment, the method in which, among the pixels in each of 2D image data, the first pixel at which the difference in brightness between identical pixels is less than the predetermined value is extracted by using a plurality of 2D image data captured by photographing an identical imaging target object under different exposure conditions, and in which the second pixel of distance image data at a position corresponding to the first pixel is set as the non-imaging pixel, can also be expressed as a method in which the information of the distance image is supplemented by using the information of the pixel at which the difference in brightness between identical pixels is less than the predetermined value on the 2D image data.

When step S3 (the extraction of the first pixel at which the difference in brightness between identical pixels is less than the predetermined value) in the image process of FIG. 3 is executed, such extraction of the pixel may be performed only when there is a certain cluster of pixels at which the difference in brightness between identical pixels is less than the predetermined value. Thereby, it becomes possible to avoid extraction of a pixel of part of a flaw or the like, which does not need to be reproduced on the distance image.

The invention claimed is:

1. An image processing apparatus comprising:
a two-dimensional image storage unit configured to store a plurality of two-dimensional image data captured by photographing an identical imaging target object under different exposure conditions;
a distance image storage unit configured to store distance image data representative of distance information depending on a spatial position of the imaging target object, the distance image data including a pixel array of a known relationship to a pixel array of the two-dimensional image data;
a pixel extraction unit configured to extract, among a plurality of pixels in each of the two-dimensional image data, a first pixel at which a difference in brightness between identical pixels is less than a predetermined value; and
a distance image adjusting unit configured to specify a second pixel of the distance image data at a position corresponding to the first pixel in the pixel array, and to set the second pixel as a non-imaging pixel in the distance image data.

2. The image processing apparatus according to claim 1, wherein the first pixel is a pixel which holds imaging information of a space in the imaging target object.

3. A robot system comprising:
a robot;
a robot controller configured to control the robot; and
the image processing apparatus according to claim 1,
wherein the robot controller is configured to cause the robot to handle the imaging target object, based on the distance image data acquired as a result of the distance image adjusting unit setting the second pixel as the non-imaging pixel.

4. The robot system according to claim 3, further comprising:
an image acquisition apparatus configured to acquire the plurality of two-dimensional image data and the distance image data.

5. The robot system according to claim 3, wherein the imaging target object includes surfaces of a plurality of objects juxtaposed with a gap interposed, the first pixel holds imaging information of the gap, and the robot individually grasps each of the plurality of objects.

6. An image processing method comprising:
storing a plurality of two-dimensional image data captured by photographing an identical imaging target object under different exposure conditions;
storing distance image data representative of distance information depending on a spatial position of the imaging target object, the distance image data including a pixel array of a known relationship to a pixel array of the two-dimensional image data;
extracting, among a plurality of pixels in each of the two-dimensional image data, a first pixel at which a difference in brightness between identical pixels is less than a predetermined value; and
specifying a second pixel of the distance image data at a position corresponding to the first pixel in the pixel array, and setting the second pixel as a non-imaging pixel in the distance image data.

* * * * *